I. S. JOSEPH.
DEHYDRATING APPARATUS.
APPLICATION FILED JAN. 14, 1914.
1,112,454.
Patented Oct. 6, 1914.
2 SHEETS—SHEET 2.
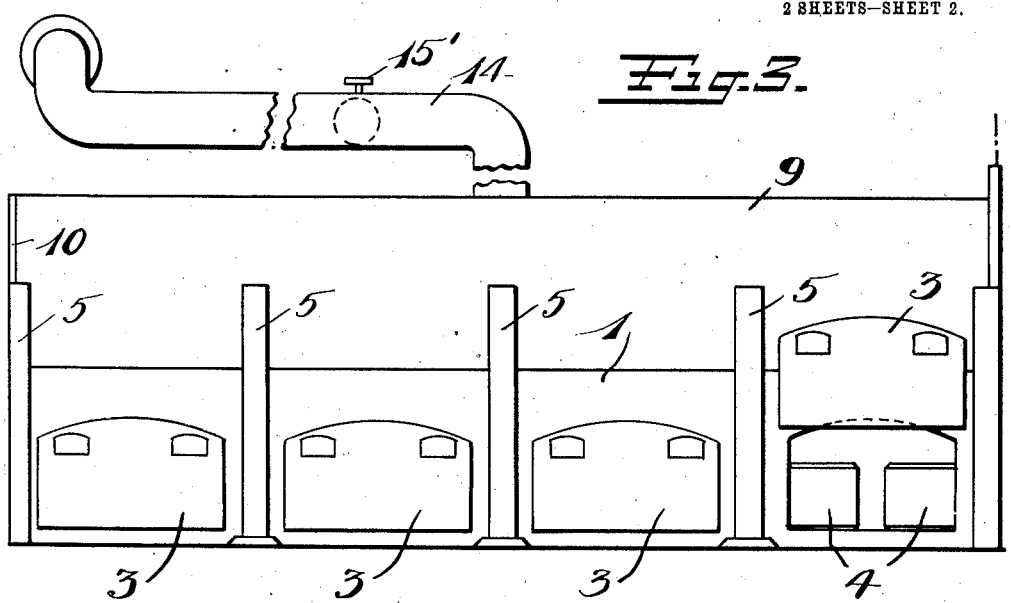
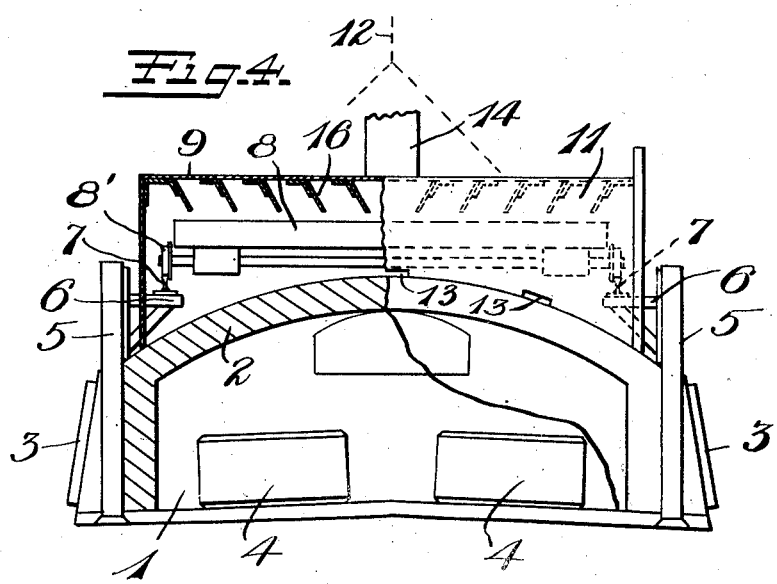
Witnesses:
Inventor
Irwin S. Joseph
By his Attorneys

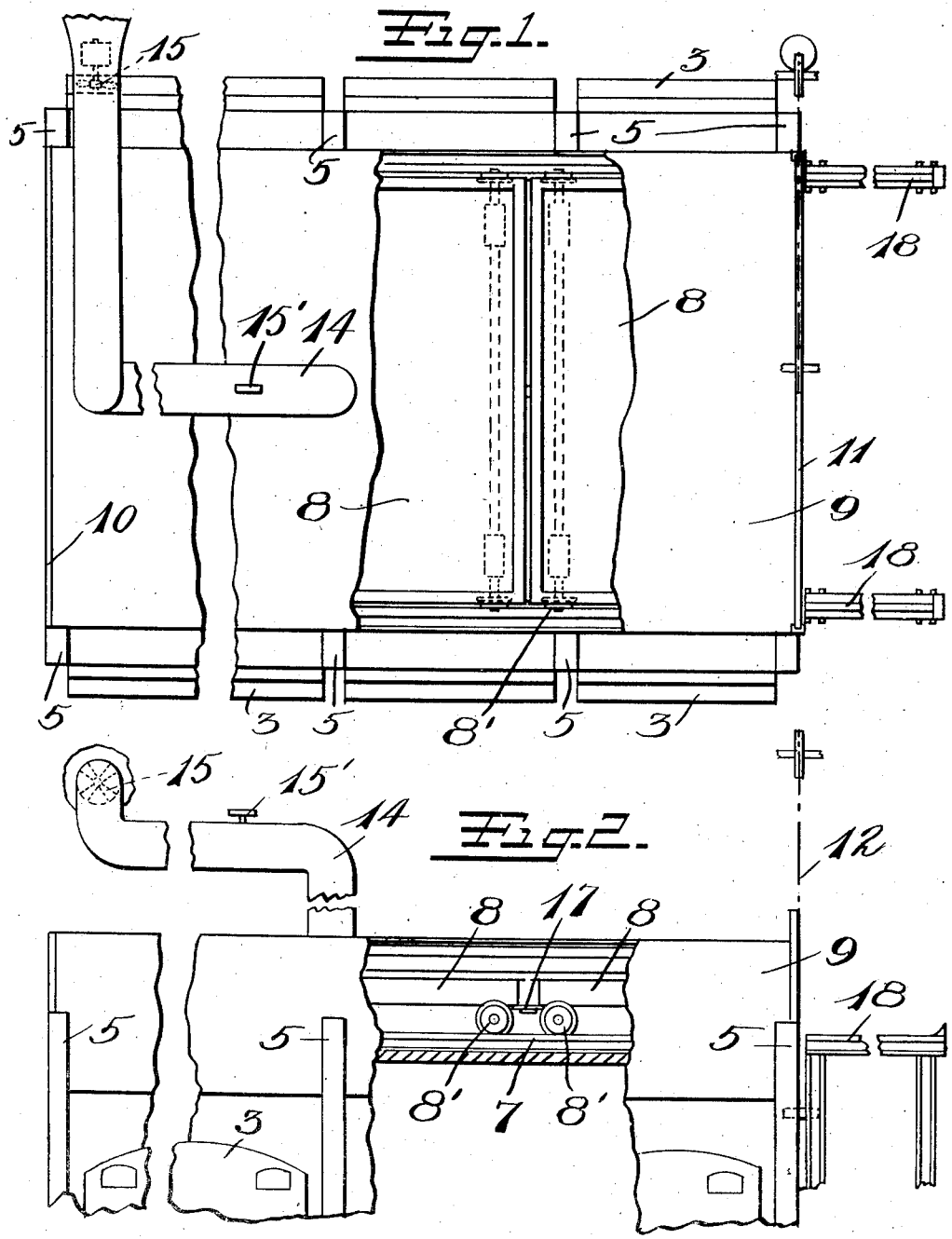

UNITED STATES PATENT OFFICE.

IRWIN S. JOSEPH, OF RAHWAY, NEW JERSEY.

DEHYDRATING APPARATUS.

1,112,454. Specification of Letters Patent. Patented Oct. 6, 1914.

Application filed January 14, 1914. Serial No. 812,015.

*To all whom it may concern:*

Be it known that I, IRWIN S. JOSEPH, a citizen of the United States, residing at Rahway, county of Union, State of New Jersey, have invented certain new and useful Improvements in Dehydrating Apparatus, of which the following is a full, clear, and exact description.

My invention relates to dehydrating apparatus and has for its object to provide means for utilizing the waste heat of glass furnaces and the like for dehydrating waste plaster of Paris, *i. e.*, the hydrated plaster of Paris that has been used in the manufacture of plate glass so that it may be repeatedly used.

Heretofore the plaster of Paris used to secure the plates of glass to the grinding and polishing tables has not only not been reclaimed so as to be used again, but has constituted a source of annoyance and expense on account of its accumulation and necessary removal. I have invented means whereby it may be easily reclaimed by the use of simple apparatus heated by the waste heat from the glass furnaces.

The following is a description of an embodiment of my invention, reference being had to the accompanying drawings, in which, Figure 1 shows a plan view of apparatus embodying my invention; Fig. 2 is a side elevation of a portion of the same; Fig. 3 is a side elevation of a portion showing the relation of the heating chamber to the glass furnace; and, Fig. 4 is a partial transverse section and partial end view of the furnace and heating chamber.

Referring more particularly to the drawings, 1 is the upper portion of a plate glass furnace of ordinary construction having the upper arch 2 and doors 3 for the insertion and removal of the pots 4.

5 are posts on each side of the furnace reinforcing the same. 6 are brackets secured to these posts. Upon these brackets are supported rails 7, one on each side of the upper surface of the furnace and running lengthwise of the same. On these rails are supported movable shallow pans 8 mounted on wheels 8' so as to form cars for containing the plaster to be reclaimed. Above the furnace is a sheathing or cover 9 of sheet iron, covering the tracks and the cars so as to largely confine the waste heat rising from the roof of the furnace. This forms a chamber closed at one end by a permanent closure 10 and at the other by a movable door 11. This door is lifted by a chain 12 passing over suitable pulleys. The door 11 is provided with openings 13 for the admission of air so that a current of air can be kept passing through the chamber. A flue 14 is connected to the center of the upper surface of the chamber and is provided with an exhaust fan 15, which may be operated hen necessary, to cause the air to circulate.

16 are baffle plates which deflect the passing air downwardly upon the contents of the pans 8.

The flue is provided with a damper 16 for regulating the flow of air therethrough.

The cars may be linked or coupled together by links 17 if desired. In order to provide for the easy removal of the cars from the chamber, supplemental rails 18 beyond the furnace and outside of the chamber are provided, on to which the cars can be rolled one at a time when the door is open, and then removed so as to permit the removal of all the cars.

In using my apparatus to reclaim hydrated plaster of Paris ($CaSO_4.2H_2O$). I place in the pans 8 the used plaster suitably air dried and pulverized, the layer of plaster being about two and one-half inches in depth. I then roll the cars into the heating chamber one at a time. The door is then lowered and the fan and damper so manipulated as to maintain a passing current of air at a suitable temperature, such as 105° to 150° centigrade, preferably about 120° C. The plaster in the pans is kept subjected to these conditions until it is dehydrated, forming $CaSO_4.\frac{1}{2}H_2O$ when it is ready to be used again, being substantially the same as plaster of Paris freshly made in the ordinary way. At 120° C. a heating of twenty-four hours is more than ample for dehydrating so that one reclaiming run can be made for each furnace run. During this period, the heat from the glass furnace varies somewhat, but it is high enough for a suitably long period to complete the dehydration.

As will be evident, my invention permits of various modifications without departing from the spirit of my invention or the scope of the appended claims. The form described having rolling cars and a chamber which can be opened at the end is the form preferred by me.

What I claim is:

1. In a reclaiming apparatus, the combination of a glass furnace having a straight longitudinally extending combustion chamber, a longitudinally extending sheet metal dehydrating chamber above the combustion chamber and in close proximity thereto, the two chambers having their longitudinal axes substantially in the same vertical plane and being disconnected so that the dehydrating chamber is heated only by radiation from said combustion chamber, said combustion chamber extending substantially the full length of the dehydrating chamber, and shallow containers within said dehydrating chamber, and in close proximity to the roof of said combustion chamber, posts extending above said glass furnace, brackets thereon, and rails within said dehydrating chamber supported by said brackets and carrying said containers, the roof of said combustion chamber being arched and the top of said rails being approximately in the horizontal plane passing through the top of said roof.

2. In a reclaiming apparatus, the combination of a glass furnace having a straight longitudinally extending combustion chamber, a longitudinally extending dehydrating chamber above the combustion chamber and in close proximity thereto, the two chambers having their longitudinal axes substantially in the same vertical plane and being disconnected so that the dehydrating chamber is heated only by radiation from said combustion chamber, said combustion chamber extending substantially the full length of the dehydrating chamber, and shallow containers within said dehydrating chamber and in close proximity to the roof of said combustion chamber, posts extending above said glass furnace, brackets thereon, and rails within said dehydrating chamber supported by said brackets and carrying said containers.

3. In a reclaiming apparatus, the combination of a glass furnace having a straight longitudinally extending combustion chamber, a longitudinally extending dehydrating chamber above the combustion chamber and in close proximity thereto, the two chambers having their longitudinal axes substantially in the same vertical plane and being disconnected so that the dehydrating chamber is heated only by radiation from said combustion chamber, said combustion chamber extending substantially the full length of the dehydrating chamber.

IRWIN S. JOSEPH.

Witnesses:
H. B. BROWNELL,
E. E. MORSE.